United States Patent Office 3,344,165
Patented Sept. 26, 1967

3,344,165
PROCESS FOR THE PREPARATION OF 2-AMINO-5-CYANOBENZOPHENONES
Benjamin Pecherer, Montclair, N.J., assignor to Hoffmann-La Roche Inc., Nutley, N.J., a corporation of New Jersey
No Drawing. Filed Oct. 26, 1964, Ser. No. 406,580
5 Claims. (Cl. 260—465)

The present invention relates to novel chemical processes for the preparation of 2-aminobenzophenones. More particularly, the present invention relates to new and novel chemical processes for the preparation of 2-amino-5-carbamoyl benzophenones, 2-amino - 5 - carboxybenzophenones and most preferably, 2-amino - 5 - cyanobenzophenones from 2-halo - 5 - trifluoromethylbenzophenones. The 2-aminobenzophenones derived from the preparative techniques described hereinafter are utilizable as starting materials in the preparation of therapeutically useful 1,4-benzodiazepines.

A novel process aspect of the present invention involves treating a compound of the formula

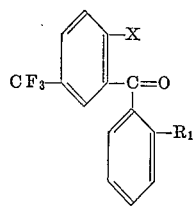

I wherein X is halogen, i.e., chlorine, bromine, fluorine and iodine, preferably chlorine and bromine and $R_1$ is selected from the group consisting of hydrogen and trifluoromethyl with ammonia at a temperature of from about 155° to about 200° C. in the presence of an aqueous medium to thereby prepare 2-amino-benzophenones of the formula

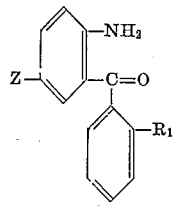

II wherein $R_1$ is as above and Z is selected from the group consisting of cyano, carbamoyl and carboxy.

This finding by the present applicant that the $CF_3$ group in position-5 of compounds of Formula I above is reactive when the last-mentioned compounds are treated with ammonia in the presence of a suitable aqueous medium and in a narrow temperature range, is unexpected since the trifluoromethyl group is known to be highly stable and to resist decomposition under either acid or alkaline conditions. The result is even the more surprising when viewed in the light of the fact that if a bis(5,2'-trifluoromethyl)-benzophenone is so treated, only the 5-trifluoromethyl group thereof is selectively converted; whereas the 2'-trifluoromethyl group remains unaffected.

It has been observed by the present applicant that on the treatment of compounds of Formula I in the manner set out above, a 5-cyanobenzophenone first results, which is converted into a 5-carbamoylbenzophenone, which in turn, is hydrolyzed to the corresponding 5-carboxy compound. In this manner, a mixture comprising a 5-cyano compound, a 5-carbamoyl compound and a 5-carboxy compound can be prepared, which mixture can be resolved into the individual components by conventional isolating procedures. The preparation of compounds of Formula II above wherein Z is cyano is especially useful since such compounds are employed in the preparation of therapeutically valuable 7-cyano benzodiazepines.

Good yields of compounds of Formula II above wherein Z is cyano result at the lower end of the temperature range set out above, i.e., from about 155° to about 185° C. At the upper end of the said temperature range, i.e., above about 190° C., the 5-carboxybenzophenone is the major product.

As is evident from the above, an especially advantageous feature of the present invention relates to a process for the preparation of the 2-amino-5-cyanobenzophenones, i.e., compounds of the formula

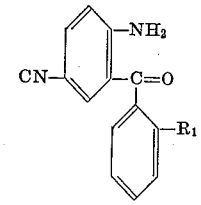

wherein $R_1$ is as above which comprises treating a compound of the formula

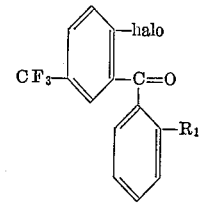

wherein $R_1$ is as above with ammonia at a temperature range of from about 155° to about 185° C. in the presence of an aqueous medium. While the time of reaction is not critical, it is, of course, to be understood that the longer the reaction period, the lower the yields of the 5-cyano-benzophenone.

Among the aqueous media suitable for use in the present invention may be included water per se or a mixture thereof with any conveniently available solvent suitable for the purposes of the present invention.

The invention is illustrated by way of the following examples which are illustrative but not limitative of the present invention. All temperatures are stated in degrees centigrade.

Example 1

Into an autoclave liner, there was placed 14.2 grams of 2-chloro-5-trifluoromethylbenzophenone, 100 ml. of 29% ammonia, 150 mg. of $Cu_2Cl_2$ and 1 gram of Emulphor (a non-ionic alkyl polyglycol ester ether). Ammonia gas was introduced into the autoclave to 130 p.s.i. at 20° and the autoclave was maintained at 180° for eight hours. The autoclave liner was cooled, the supernatant ammoniacal liquor decanted away and the oily solid which remained taken up in about 1 l. of 1–1 ether-benzene. The ether-benzene solution was washed with water, dried over anhydrous potassium carbonate and then the solvent was removed in vacuo. A greenish-yellow oily solid remained which soon solidified into a crystalline mass. Recrystallization of the mass from about 800 ml. of 90–120° ligroin gave a yellow-green solid melting at 160–163°. Further recrystallization from 90–120° ligroin gave 2-amino - 5 - cyanobenzophenone, melting point 161.5–163.50°.

Example 2

In an autoclave liner of 160 ml. working capacity, there was placed 18 grams of 2-chloro-2′,5-bis(trifluoromethyl)-benzophenone, 125 ml. of concentrated ammonium hydroxide, 1 gram of Emulphor and 0.15 gram of cuprous chloride. The liner was placed in the autoclave and additional ammonia was introduced to 135 lbs. p.s.i. The autoclave was then sealed and heated at 180° for eight hours. After cooling, the excess ammonia was vented and the liner removed from the autoclave. The contents of the liner which comprised an oil and an aqueous solution, were transferred to a separatory funnel using 100 ml. of ether. After separating the layers, the aqueous phase was extracted twice with 100 ml. of ether. The ether layers were combined, washed with saturated sodium chloride solution, then with water and finally dried. The solvent was evaporated off in vacuo leaving a dark oil that solidified to a crystalline mass. The crystalline mass was extracted with boiling petroleum ether (60–90°) leaving an insoluble oily residue that crystallized on cooling to room temperature. Its melting point was 131–135°. From the hot petroleum ether extract, there separated on chilling overnight, two types of crystals, large brown clusters and small grayish prisms. Such were separated by suspending the small gray prisms in the mother liquor and decanting off the suspension. Crystals that melted at 129–144° were obtained. These were combined with the above material of melting point 131–135° and recrystallized from 50% ethanol. After sublimation of the resulting material at 145–150°/0.2 mm. and recrystallization from aqueous methanol, 2-amino-5-cyano-2'-trifluoromethyl-benzophenone was obtained in the form of large transparent yellow rhombs that melted at 151–153.5°.

*Example 3*

Into an autoclave liner of 160 ml. of working capacity was placed 18 g. of 2-chloro-2',5-bis(trifluoromethyl)-benzophenone (0.05 mole), 125 ml. of ammonium hydroxide, 1 g. of Emulphor, and 0.15 g. of cuprous chloride.

After loading into the autoclave, additional ammonia pressure to 100–125 p.s.i. was introduced. The autoclave was then sealed and heated for 8 hrs. at 190°. When cool, the contents consisted of a greenish aqueous solution over an organic phase. The aqueous layer was poured off and the residual oil, while still in the liner, was washed by suspending it in 100 ml. of water, allowing the oil to settle, and decanting the supernatant. This wash was added to the original aqueous layer. The residual oil solidified after this treatment. After a single recrystallization from aqueous methanol, bright yellow crystals appeared, melting point 225–227.5°. After recrystallization 50% aqueous acetic acid, 2-amino-5-carbamoyl-2'-trifluoromethylbenzophenone, melting point 227.5–230°, was obtained.

The combined aqueous ammoniacal liquors and wash was evaporated to dryness and a greenish yellow solid was obtained. This was dissolved in dilute ammonia and filtered. On acidification, a yellow solid was obtained that was recrystallized from 50% aqueous isopropanol to yield crystals melting at 199–205°. Another recrystallization from aqueous acetic acid gave 3-(2'-trifluoromethyl-benzoyl)-4-aminobenzoic acid as yellow crystals melting at 212–213.8°.

When this reaction was carried out at 200°, the product consisted almost entirely of 3-(2'-trifluoromethyl-benzoyl-4-aminobenzoic acid with minor amounts of 2-amino-5-carbamoyl-2'-trifluoromethylbenzophenone.

I claim:
1. A process for the preparation of a compound of the formula

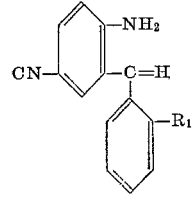

wherein $R_1$ is selected from the group consisting of hydrogen and trifluoromethyl
which comprises reacting a compound of the formula

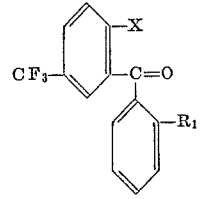

wherein X is halogen and $R_1$ is as above
with ammonia at a temperature from about 155° C. to about 185° C. in the presence of an aqueous medium.

2. The process of claim 1 process which comprises treating 2-chloro-5-trifluoromethylbenzophenone with ammonia in the presence of an aqueous medium and at a temperature of from about 155° C. to about 185° C.

3. The process of claim 1 process which comprises treating 2-chloro-5-trifluoromethylbenzophenone with ammonia at a temperature of from about 155° C. to about 185° C. in the presence of water.

4. The process of claim 1 process which comprises reacting 2-chloro-5,2'-bis(trifluoromethyl)benzophenone with ammonia in the presence of an aqueous medium and at a temperature of from about 155° C. to about 185° C.

5. The process of claim 1 process which comprises reacting 2-chloro-5,2'-bis(trifluoromethyl)benzophenone with ammonia in the presence of water and at a temperature of from about 155° C. to about 185° C.

References Cited

UNITED STATES PATENTS

| 3,109,843 | 11/1963 | Reeder et al. | 260—465 XR |
| 3,117,965 | 1/1964 | Saucy et al. | 260—558 XR |
| 3,131,178 | 4/1964 | Archer et al. | 260—465 XR |
| 3,141,890 | 7/1964 | Reeder et al. | 260—558 XR |
| 3,153,082 | 10/1964 | Sternbech et al. | 260—517 XR |
| 3,182,054 | 5/1965 | Sternbech et al. | 260—465 XR |
| 3,222,359 | 12/1965 | Reeder et al. | 260—465 XR |

OTHER REFERENCES

Shein et al., C. A. 61 (1964), page 13163e.

JOSEPH P. BRUST, *Primary Examiner.*